(12) United States Patent
Hanna et al.

(10) Patent No.: US 10,544,277 B2
(45) Date of Patent: Jan. 28, 2020

(54) PROCESS FOR MAKING GRAY EXPANDED POLYSTYRENE

(71) Applicant: Baker Hughes, a GE Company, LLC, Houston, TX (US)

(72) Inventors: Paul Hanna, Sugar Land, TX (US); Hakim Hazaimeh, Richmond, TX (US); William Cottom, Richmond, TX (US); Jeff Brooks, Owasso, OK (US)

(73) Assignee: Baker Hughes, a GE company, LLC, Houston, TX (US)

( * ) Notice: Subject to any disclaimer, the term of this patent is extended or adjusted under 35 U.S.C. 154(b) by 141 days.

(21) Appl. No.: 15/787,083

(22) Filed: Oct. 18, 2017

(65) Prior Publication Data

US 2019/0112447 A1 Apr. 18, 2019

(51) Int. Cl.
| | | |
|---|---|---|
| C08K 3/04 | (2006.01) |
| C08F 12/08 | (2006.01) |
| C08F 2/18 | (2006.01) |
| C09C 1/48 | (2006.01) |
| C08L 25/06 | (2006.01) |

(52) U.S. Cl.
CPC ............ *C08K 3/04* (2013.01); *C08F 2/18* (2013.01); *C08F 12/08* (2013.01); *C08L 25/06* (2013.01); *C09C 1/48* (2013.01); *C08F 2500/01* (2013.01); *C08F 2500/04* (2013.01)

(58) Field of Classification Search
CPC ..................................................... C08F 2/18
See application file for complete search history.

(56) References Cited

U.S. PATENT DOCUMENTS

| | | | |
|---|---|---|---|
| 6,340,713 B1 | 1/2002 | Glueck et al. |
| 6,362,242 B1 | 3/2002 | Glueck et al. |
| 6,414,041 B1 * | 7/2002 | Gluck ................... C08J 9/0066 521/56 |
| 6,444,714 B1 * | 9/2002 | Gluck ................... C08F 12/08 521/56 |
| 2009/0030096 A1 * | 1/2009 | Lee ....................... C08F 292/00 521/60 |
| 2013/0289146 A1 * | 10/2013 | Kim ........................ C08K 7/24 521/59 |

FOREIGN PATENT DOCUMENTS

| | | |
|---|---|---|
| EP | 0668139 A1 | 8/1995 |
| EP | 372343 B1 | 1/2000 |
| EP | 1925418 A1 | 5/2008 |

OTHER PUBLICATIONS

Cottom, W. P., "Additives for Expanded Polystyrene Suspension Formulations", IP.com, IPCOM000244928D, Feb. 1, 2016.
Lopes, Christina N., et al., "Effect of Initiator on the Incorporation of Graphite into Polymer Matrix During Suspension Polymerization", Macromol. Symp. 2005, 229, 72-80.
Trommsdorff, U., et al., "Melt Impregnation Technology: Enhancement of the Thermal Resistance of EPS with Carbon Black", FOAMS 2015 Conference, Sep. 10-11, 2015, 7 pages.

* cited by examiner

*Primary Examiner* — Wenwen Cai
(74) *Attorney, Agent, or Firm* — Mossman, Kumar & Tyler, P.C.

(57) ABSTRACT

Gray expanded polystyrene achieving target molecular weight, bead size, bead distribution, and cell structure may be reproducibly prepared by suspension polymerization by introducing to the suspension polymerization an additive that is carbon black and/or graphite only after approximately 20 to 60 wt % of the styrene monomer has been converted to polystyrene. Introducing the additive at this point slows the polymerization rate, such as for an optimized period of time to allow for the droplet size to equilibrate to the desired target range. In one nonlimiting embodiment, the styrene polymerization rate has about 35 wt % to about 60 wt % styrene monomer remaining after about 3 hours from the beginning of polymerizing.

15 Claims, No Drawings

PROCESS FOR MAKING GRAY EXPANDED POLYSTYRENE

TECHNICAL FIELD

The present invention relates to methods for preparing expanded polystyrene (EPS), and more particularly relates, in one non-limiting embodiment, to methods for preparing gray EPS with a desired bead distribution by suspension polymerization.

TECHNICAL BACKGROUND

Expandable Polystyrene (EPS) has been made using suspension polymerization for over 50 years. Multiple formulation systems have been used depending on the equipment available, polymerization process used, and desired end use properties. EPS can be made using multiple techniques, including extrusion of polystyrene with addition of blowing agents through underwater dies to form expandable beads or suspension polymerization of styrene monomer with subsequent addition of blowing agents.

The addition of graphite and/or carbon black to make gray (or grey) EPS has been practiced for over 15 years. Grades and types of graphite and/or carbon black are selected to provide the desired end use properties. More specifically, carbon black and/or graphite can be added to EPS to improve the aesthetics or to improve the function of the finished EPS part. For improved aesthetics, generally the desired effect is to provide a consistent color. The amount of color can be measured visually by comparing to standards, or measured by instruments to determine reflectance, and color shifts.

For improved function, tests are normally run on a finished part. One example of improved function is for insulation grade EPS. Normal "white" grade EPS provides efficient, light weight insulation, and is widely used for home and commercial building construction. Improved insulation values have been obtained by adding graphite or carbon black to insulation grade EPS to give gray EPS. These grades provide improved insulation performance (measured as thermal conductivity, or lambda) vs. the normal "white" grades when formed at the same mass, or can provide equal insulation when formed with less mass.

For good color development in gray EPS, the carbon black and/or graphite must be dispersed efficiently within the EPS. This can be accomplished through the use of mechanical shear, dispersing agents, or a combination of dispersing agents with mechanical shear. Additionally, processes for production of carbon black and/or graphite can be modified to change the surface characteristics of the carbon black and/or graphite particles, and improve the ability to disperse these particles within polymers such as EPS.

The efficient mixing of carbon black and/or graphite in EPS can be made easier through the use of carbon black and/or graphite masterbatches, where relatively high concentrations of carbon black and/or graphite have been mixed with polystyrene under high shear conditions and then extruded to form pellets. The use of dispersing agents may also be used in combination with the high shear conditions to make masterbatches. The masterbatches also have the advantage of creating less dust while handling carbon black and/or graphite.

As previously noted, the addition of carbon black and/or graphite is known to improve the insulation values of EPS beads. For EPS produced using the extrusion method, the addition of carbon black and/or graphite is established art. However, producing gray EPS using the suspension polymerization method is more challenging. The addition of carbon black and/or graphite to the suspension formulation can create emulsion instability, leading to poor bead size distribution or even invert the emulsion from styrene in water to water in styrene, which can lead to gelling of the reactor. Previous art teaches that the suspension method may be used, but notes the addition of about 3-20% polystyrene to the styrene monomer improves the stability. It has been found that achieving desired bead distributions and cell structure can be difficult even using these levels or even higher amounts of polystyrene.

Additionally, the carbon black and/or graphite can interact with the radical initiators, requiring much higher levels of the radical initiators to achieve the targeted amount of polymerization. The interactions between radical initiators and carbon black and/or graphite can also create a variation in the polymerization rate.

Currently, preventing the instability requires careful monitoring of the reactor mass, including measuring the amount of conversion and estimation of bead size and distribution. Frequently, increases in the amount of radical initiator, surfactant and stabilizer are required to attempt to keep the emulsion stable with the proper bead size and bead size distribution. While this is possible in small laboratory and pilot reactors, it is much less practical for larger scale reactors.

Many EPS formulations already employ polyethylene wax as a processing agent to improve the cell structure of the EPS bead. Polyethylene waxes can also provide improvement for dispersion of carbon black or graphite within the EPS bead, as disclosed in W. P. Cottom, "Additives for Expanded Polystyrene Suspension Formulations", IP.com, IPCOM000244928D, 1 Feb. 2016), as well as minimize the interaction between the carbon black and/or graphite and the radical initiator. Other products disclosed included alcohols, ethoxylates, carboxylic acids, polymers, copolymers, oxidized polyethylenes, and modified waxes.

It has been confirmed that many of those products could minimize the interaction between the carbon black and/or graphite and the radical initiator. Additionally, adding up to 20% polystyrene can also improve stability. However, it was still very difficult to obtain the desired bead size and distribution using existing methods. The process required monitoring the conversion on a frequent basis, with multiple additions of radical initiator, surfactant, and dispersing agent even when making laboratory scale batches. Based on the inventors' experience, the process was not robust enough to transfer to commercial scale reactions.

It would thus be desirable to devise a method for preparing gray EPS with molecular weight, bead size, bead size distribution, and cell nucleation by suspension polymerization similar to those of white EPS on a consistent basis.

SUMMARY

There is provided in one non-restrictive version, a method for preparing gray expanded polystyrene (EPS), where the method includes polymerizing styrene monomer to polystyrene by suspension polymerization; then, only after approximately 20 to 60 wt % of the styrene monomer has been converted to polystyrene, introducing to the suspension polymerization an additive selected from the group consisting of carbon black, graphite, and combinations thereof; and after a period of polymerizing to ensure good mixing and allow droplet size to equilibrate to a desired range; in one non-limiting embodiment of about 0.1 mm to about 1.0 mm;

then continuing to polymerize the styrene monomer to polystyrene by suspension polymerization to produce gray EPS.

DETAILED DESCRIPTION

An improvement in the production of gray EPS using the suspension method has been discovered. Instead of adding the carbon black and/or graphite at the start of the reaction, it has been found that by introducing these additives later in the process after approximately 20-60 wt % of the styrene monomer has been converted to polystyrene, and creating an optimized period of slow polymerization to allow droplet size equilibrium and mixing of the carbon black throughout. a product with molecular weight, bead size, bead distribution, and cell structure very similar to that of white or standard EPS made using routine suspension polymerization can be obtained. Additionally, far less radical initiator may be used as compared to a conventional method when adding the carbon black and/or graphite at the start of the reaction, and using this method it is possible to add a consistent amount of surfactant and dispersant during the process.

For the purposes of the present invention, expanded styrene polymers are styrene polymers containing blowing agents. The blowing agents may be conventional.

The target parameters of the gray EPS produced by the method described herein will vary depending on the item to be made and its ultimate end use. With respect to gray EPS molecular weight, in one non-limiting embodiment the gray EPS has a weight average molecular weight between about 50,000 independently to about 1,000,000 amu; alternatively from about 150,000 to about 750,000 amu. As used herein with respect to a range, the term "independently" means that any threshold may be used together with another threshold to give a suitable alternative range. For instance, in this case a suitable molecular weight range may be from 50,000 to about 150,000 amu. A precise or actual mw is not that relevant since customers choose different molecular weights to accomplish different purposes in different applications. The method described herein permits reproducibly forming the beads of any target molecular weight size.

Similarly, a target range for bead size will vary depending on the part to be made. In one non-restrictive version, the gray EPS has a bead size between about 50 independently to about 1500 microns; in one non-limiting embodiment between about 500 independently to about 1300 microns; alternatively between about 850 independently to about 1170 microns. Nevertheless other ranges may be used for making different parts.

With respect to bead size distribution, sometimes a customer may want a broad distribution to hit multiple targets with one run, but generally a customer wants a high concentration in the target range. In one non-limiting embodiment, suitable bead distribution is from about 10 independently to about 90 weight % of the beads in the range of about 850 independently to about 1170 microns; alternatively from about 35 independently to about 90 weight % of the beads in the range of about 850 independently to about 1170 microns.

The desired cell structure generally means that the cell structure is uniform so that the expansion will be uniform. A preferred range for cell size will vary depending on the part to be made. It can be important to be able to adjust the method to hit the desired target. In one non-limiting embodiment, the cell size ranges between about 4 independently to about 20 cells per millimeter; alternatively the cell size ranges between about 8 independently to about 16 cells per millimeter.

In one non-restrictive version, the polystyrene density may range from about 5 independently to about 35 g/l (grams/liter), alternatively from about 8 independently to about 25 g/l, and in another non-limiting embodiment from about 10 independently to about 15 g/l.

There are many ways to control the introduction of carbon black and/or graphite to the formulation after approximately 20 independently to approximately 60 wt % of the styrene has been converted to polystyrene; alternatively from about 30 independently to about 50 wt %. One convenient, non-limiting way is to use carbon black and/or graphite which has been predispersed into polystyrene as a masterbatch. When the masterbatch is added to the suspension formulation at the proper time, the polystyrene portion of the masterbatch starts dissolving into the styrene monomer. The dissolving rate is controlled by the molecular weight of the polystyrene used in the masterbatch, the size of the masterbatch pellets, the amount of remaining styrene monomer, the reaction temperature, and the stirring rate. This process allows the carbon black and/or graphite to also be evenly dispersed into the monomer droplets, but minimizes the interactions between the carbon black and/or graphite and radical initiator, surfactant, and dispersing agent until at least 20-60 wt % of the styrene has been converted. After the majority of the polystyrene has been solvated by the styrene monomer, the interaction between the carbon black and/or graphite and radical initiator dramatically slows down the polymerization rate. This slower polymerization rate allows time for the droplet size to equilibrate to the desired range and for the carbon black to mix efficiently. This desired droplet size range is between about 0.1 mm and about 1.0 mm. An additional dose of radical initiator can then be added to complete the polymerization. However, the additional dose of radical initiator is far less than the amount needed if the carbon black and/or graphite is added at the beginning of the reaction. In one non-limiting embodiment, the desired droplet size ranges from about 100 independently to about 1000 microns; alternatively from about 75 independently to about 1500 microns; and in another non-restrictive version from about 50 independently to about 2000 microns.

Essentially any molecular weight masterbatch may be used, in any size pellets. What may be important is that it will take longer to dissolve with higher molecular weights and bigger pellets. In one non-limiting embodiment, the amount of remaining styrene monomer at the time of introduction of the predispersed masterbatch, ranges from about 70 independently to about 20 wt %, alternatively from about 60 independently to about 40 wt %.

In the predispersed masterbatch embodiment, the reaction temperature may range from about 80 independently to about 100° C. followed by about 110 independently to about 140° C.; alternatively the reaction temperature may range from about 85 independently to about 95° C. followed by about 125 independently to about 135° C.

Stirring rates depend on reactor conditions and are not necessarily a limiting factor for the methods described herein. What is important is good mixing. For the experiments described below, a suitable range is from about 200 independently to about 600 rpm; alternatively from about 300 independently to about 450 rpm.

With respect to the free radical initiator used for the predispersed masterbatch embodiment, two initiators are used: a primary initiator and a secondary initiator. The secondary initiator is introduced after the droplet size has equilibrated within the desired size range. These may be the same initiator, just added at different times. A primary free radical initiator may be is activated at about 90° C. in an amount from about 0.3 wt % independently to about 0.5 wt % based on the styrene monomer present, and a secondary free radical initiator is activated at about 130° C. in an amount from about 0.1 wt % to about 0.3 wt % based on the styrene monomer. Alternatively, a primary free radical initiator may be activated at about 90° C. in an amount from about 0.35 wt % independently to about 0.45 wt % based on the styrene monomer, and a secondary free radical initiator is activated at about 130° C. in an amount from about 0.15 wt % to about 0.25 wt % based on the styrene monomer.

A second embodiment to control the addition of carbon black and/or graphite is to add fluff or powder grades to the white formulation after at least about 20 to about 60 wt % of the styrene has been converted. The interaction between the carbon black and radical initiator dramatically slows down the polymerization rate. This slow rate is held for an optimized period of time to allow for the droplet size to equilibrate to the desired range. Again, this optimized period of time depends on many factors including the target parameters for the gray EPS and thus even a general time period or range is difficult to specify. The optimized time period will also depend upon the size of the reactor. An additional dose of radical initiator can then be added to complete the polymerization. However, the additional dose of radical initiator is far less than the amount needed if the carbon black and/or graphite is added at the beginning of the reaction. With more specificity, a free radical initiator may be introduced in an initial dose and in an additional or subsequent dose, for instance an initial dose in an amount from about 0.3 wt % independently to about 0.5 wt % based on the styrene monomer present and a free radical initiator is introduced in an additional dose in an amount from about 0.4 wt % independently to about 0.6 wt % based on the styrene monomer. Alternatively, a free radical initiator may be activated in an initial dose in an amount from about 0.35 wt % independently to about 0.45 wt % based on the styrene monomer, and a free radical initiator is introduced in an additional dose in an amount from about 0.45 wt % independently to about 0.55 wt % based on styrene. The initiator for the initial and additional doses may be the same or different. The additional dose is introduced after the droplet size has equilibrated within the desired size range.

It is expected that a wide size range of fluff and wide range of powder grades may be used. In one non-limiting embodiment the proportion of fluff or powder grade ranges from about 5 wt % independently to about 10 wt % based on the styrene monomer; alternatively ranges from about 6 wt % independently to about 8 wt % based on the styrene monomer.

Using the second embodiment of introducing fluff or powder grade carbon black or graphite, the slowing down of the polymerization rate will vary depending upon reaction conditions. For some conventional configurations, the standard (existing art) reaction will proceed to only about 5 wt % to 25 wt % styrene monomer remaining after three hours polymerization. With the new method described herein, there is about 35 wt % to about 60 wt % styrene monomer remaining after three hours, as one non-limiting embodiment.

A third non-restrictive embodiment of the method herein is to combine the predispersed masterbatch and the fluff/powder grade procedures. The fluff or powder grade may be added after at least about 20 to about 60 wt % of the styrene has been added, while the masterbatch can be added earlier or at the same time. If added at the same time, more time should be allowed for the polystyrene in the masterbatch to dissolve in the remaining styrene monomer before adding the additional dose of radical initiator.

In this non-limiting combination version, the amount of masterbatch pellets may range from about 10 wt % independently to about 22.5 wt % based on the styrene monomer, alternatively from about 15 independently to about 20 wt % based on the styrene monomer. The amount of fluff and/or powder grade carbon black and/or graphite may range from about 0.1 wt % independently to about 1 wt % based on the styrene monomer, alternatively from about 0.2 wt % independently to about 0.4 wt % based on the styrene monomer. For the free radical initiator, an initial and an additional or subsequent dose may be used where the initial dose may range from about 0.3 wt % independently to about 0.5 wt % based on the styrene monomer; alternatively from about 3.5 wt % independently to about 0.45 wt % based on the styrene monomer. Similarly, the additional dose may range from about 0.3 wt % independently to about 0.5 wt % based on the styrene monomer; alternatively from about 0.35 wt % independently to about 0.45 wt % based on the styrene monomer. In this third, non-restrictive version, the amount of remaining styrene monomer after three hours may be from about 70 independently to about 20 wt %; alternatively from about 60 independently to about 40 wt %.

Generally for the method described herein, the proportions of carbon black and/or graphite based on the resulting styrene polymer range from about 0.1 independently to about 10 wt %; alternatively from about 3 independently to about 8 wt %. The graphite used suitably has an average particle size of from about 1 independently to about 50 μm; alternatively from about 2.5 independently to about 12 μm. The graphite may also have a bulk density of from about 100 to about 500 g/l and a specific surface area of from about 5 to about 20 m$^2$/g, in a non-limiting embodiment. Natural graphite or synthetic graphite may be used. There are no particular restrictions on the size of carbon black particles or powders. The particles are small, but work together as larger aggregates, and thus the individual particle size is not relevant.

Conventional surfactants and dispersing agents may be used. A particular, non-limiting suitable surfactant is sodium dodecyl benzene sulfonate. A particular, suitable non-limiting dispersing agent is tricalcium phosphate. The amounts or proportions of surfactant or dispersing agent are adjusted to produce the desired bead size. To get the desired bead size and bead size distribution, it may be necessary to add additional surfactant and/or dispersing agent when adding the carbon black and/or graphite to the formulation. Under the process described herein, there is time for the additional surfactant and/or dispersing agent to create the desired bead size and bead size distribution before the polymer's viscosity is too high for the bead size to equilibrate.

Any suitable, conventional initiator may be used in the method described herein. In non-limiting embodiments, dibenzoyl peroxide may be used as a primary or initial initiator which functions at a temperature of about 90° C., whereas t-butylperoxy benzoate may be used as a secondary or additional initiator which functions at a temperature of about 130° C.

Using the improved process described herein, it is possible to make gray EPS with molecular weight, bead size, bead size distribution, and cell nucleation similar to those of white EPS on a consistent basis. Further, it is possible to make small adjustments to the radical initiator, surfactant, and dispersing aid to make optimized final product. It has also been discovered that the use of products such as polyethylene and long chain alcohols work very effectively in the improved process to provide better cell structure and help control bead size and distribution.

It is believed that the discovery of dramatically slowing the polymerization rate after addition of the carbon black and/or graphite to allow time to create a desired distribution of the beads is a novel approach. U.S. Pat. No. 6,362,242 B1 describes a process claimed to be suitable for making Gray suspension grade EPS using graphite. When trying to replicate a similar process, the inventors were able to confirm that gray suspension grade EPS could be made, but the process required constant monitoring, frequent adjustments, and higher levels of radical initiator. A paper by Lopes et al., "Effect of Initiator on the Incorporation of Graphite into Polymer Matrix During Suspension Polymerization", Macromolecular Symposia, Volume 229, Pages 72-80, 2005, (DOI:10.1002/masy.200551109) cites the known interaction between graphite and radical initiators often used in the industry. Those authors suggest that other radical initiators may have less interaction, but those other initiators require cold storage which may not be practical for many locations. The method described herein allows the use of the more common initiator and permits lower levels of initiator as compared with the current practice of introducing the carbon black and/or graphite additive at the start of the reaction, and additionally requires less frequent monitoring. The improved process is more robust and should allow easier scaling up to commercial production.

The styrene polymers described herein can contain the customary and known auxiliaries and additives, for example flame retardants, nucleating agents, UV stabilizers, chain transferrers, chain extenders, blowing agents, plasticizers, pigments and anti-oxidants.

Additionally, it will be recognized that comonomers compatible with styrene to be copolymerized therewith may also be included; suitable ethylenically unsaturated comonomers include, but are not necessarily limited to, alkylstyrenes, divinylbenzene, acrylonitrile, α-methylstyrene and combinations thereof.

It will be appreciated that the method described herein may be implemented in a wide variety of ways. The following Examples are provided to simply illustrate the method of late introduction of the additive and are not intended to limit the method or invention in any way.

EXAMPLE 1

1020 grams of reagent grade styrene monomer was added to 1688 grams of deionized water in a 4-liter pressure-resistant stirred reactor. 6 grams of tricalcium phosphate (TCP), 0.06 grams of NACCONOL® 90 G (Stepan Company), 3.75 grams of dibenzoyl peroxide (BPO), 1 gram of t-butyl peroxybenzoate (TBPB), 0.375 grams of calcium carbonate, 175 grams of PS6310 (masterbatch of carbon black in polystyrene, supplied by Cabot Corporation), and 1.125 grams of POLYWAX™ 1000 polyethylene (Baker Hughes, a GE company) were added to the reactor before purging with nitrogen and sealing. The mixture was heated rapidly to 90° C. with stirring. After polymerizing for 1 hour at 90° C., 57 grams of TCP, 0.54 grams of NACCONOL 90G, 5 grams of BPO, and 1.125 grams of calcium carbonate were added to the reactor. The reactor was sealed and the polymerization continued for 1.0 hour. The reactor was then opened again, and 25 grams of TCP and 1.62 grams of NACCONOL 90G were added to the reactor. The reactor was sealed and held at 90° C. for an additional 3.5 hours. The reactor was then opened again, and 2 grams of TBPB and 0.375 grams of calcium carbonate were added. The reactor was sealed, and 128 grams of pentane were added to the reactor. The reactor was then heated rapidly to 130° C. and held at this temperature for 3 hours. The reactor was then cooled to 60° C. or less while stirring. The polystyrene beads were washed with water and dried. The beads were then classified by size in a Gilson shaker using #10 (2000 microns), 14 (1400 microns), 16 (1180 microns), 20 (855 microns), 25 (710 microns), 30 (600 microns), 35 (500 microns), and 45 (355 microns) sieves.

EXAMPLE 2

Example 1 was repeated two weeks later using the same equipment, same reagents, and same conditions.

EXAMPLE 3

1040 grams of reagent grade styrene monomer was added to 1688 grams of deionized water in a 4 L pressure-resistant stirred reactor. 6 grams of tricalcium phosphate (TCP), 0.06 grams of NACCONOL 90 G, 3.75 grams of dibenzoyl peroxide (BPO), 1 gram of t-butyl peroxybenzoate (TBPB), 0.375 grams of calcium carbonate, and 1.125 grams of POLYWAX™ 1000 polyethylene (Baker Hughes, a GE company) were added to the reactor before purging with nitrogen and sealing. The mixture was heated rapidly to 90° C. with stirring. After polymerizing for 2 hours at 90° C., 175 grams of PS6310 (masterbatch of carbon black in polystyrene, supplied by Cabot Corporation), 54 grams of TCP, 0.41 grams of NACCONOL 90G, and 1.125 grams of Calcium carbonate were added to the reactor. The reactor was sealed and the polymerization continued for 0.5 hours. The reactor was then opened again, and 3 grams of CSX938F (carbon black fluff supplied by Cabot Corporation) was added to the reactor. The reactor is sealed and held at 90° C. After equilibrating for 30 minutes, an additional 4 grams of BPO was added to the reactor. The reactor was sealed and held at 90° C. for an additional 90 minutes. 128 grams of pentane was then added to the reactor and the reaction was heated rapidly to 130° C. and held at that temperature for 3 hours. The reactor was then cooled to 60° C. or less while stirring. The polystyrene beads were washed with water and dried. The beads were then classified by size in a Gilson shaker using #10 (2000 microns), 14 (1400 microns), 16 (1180 microns), 20 (855 microns), 25 (710 microns), 30 (600 microns), 35 (500 microns), and 45 (355 microns) sieves.

EXAMPLE 4

Example 3 was repeated 10 weeks later using the same equipment. The same reagents were used except for a new batch of PS6310. The results of Examples 1-4 are summarized in Table I.

TABLE 1

| Experiment | % styrene at 3 hrs | % beads < target | % beads in target | % beads >target |
|---|---|---|---|---|
| 1 | 6 | 26 | 45 | 29 |
| 2 | 24 | 8 | 26 | 66 |
| 3 | 48 | 28 | 42 | 30 |
| 4 | 41 | 30 | 41 | 29 |

It may be seen from Table I that by using the methods described herein a substantial proportion of the polystyrene beads produced were within the target size range.

Examples 1 and 2 are comparative Examples using existing procedures. Example 1 showed a good percentage of beads in the target size, but Example 2 using the same conditions did not reproduce the results of Example 1.

Example 3 and 4 are inventive Examples which show both good and consistent bead size distributions In the foregoing specification, the invention has been described with reference to specific embodiments thereof, and has been demonstrated as effective in providing methods producing gray EPS by suspension polymerization. However, it will be evident that various modifications and changes can be made thereto without departing from the broader scope of the invention as set forth in the appended claims. Accordingly, the specification is to be regarded in an illustrative rather than a restrictive sense. For example, different proportions of carbon black and/or graphite additive, different desired droplet size ranges, different gray EPS densities, different gray EPS weight average molecular weights, different gray EPS bead sizes, different gray EPS bead distributions, different gray EPS cell sizes, different free radical initiators and proportions thereof, different surfactants and proportions thereof, different dispersing agents and proportions thereof, different process parameters, from those described and exemplified herein are nevertheless encompassed.

The present invention may suitably comprise, consist of or consist essentially of the elements disclosed and may be practiced in the absence of an element not disclosed. For instance, there may be provided a method for preparing gray expanded polystyrene (EPS), where the method consists essentially of or consists of polymerizing styrene monomer to polystyrene by suspension polymerization; only after approximately 20 to 60 wt % of the styrene monomer has been converted to polystyrene, introducing to the suspension polymerization an additive selected from the group consisting of carbon black, graphite, and combinations thereof; and after a period polymerizing to allow droplet size to equilibrate to within a desired size range; and continuing to polymerize the styrene monomer to polystyrene by suspension polymerization to produce gray EPS. It will be understood that a free radical initiator is used to catalyze the polymerization, and that the reaction mixture may also comprise, consist essentially of, and/or consist of surfactants and/or dispersing agents and other conventional additives.

As used herein, the terms "comprising," "including," "containing," "characterized by," and grammatical equivalents thereof are inclusive or open-ended terms that do not exclude additional, unrecited elements or method acts, but also include the more restrictive terms "consisting of" and "consisting essentially of" and grammatical equivalents thereof. As used herein, the term "may" with respect to a material, structure, feature or method act indicates that such is contemplated for use in implementation of an embodiment of the disclosure and such term is used in preference to the more restrictive term "is" so as to avoid any implication that other, compatible materials, structures, features and methods usable in combination therewith should or must be, excluded.

As used herein, the singular forms "a," "an," and "the" are intended to include the plural forms as well, unless the context clearly indicates otherwise.

As used herein, the term "and/or" includes any and all combinations of one or more of the associated listed items.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, or even at least 99.9% met.

As used herein, the term "about" in reference to a given parameter is inclusive of the stated value and has the meaning dictated by the context (e.g., it includes the degree of error associated with measurement of the given parameter).

What is claimed is:

1. A method for preparing gray expanded polystyrene (EPS), the method comprising:
   polymerizing styrene monomer to polystyrene by suspension polymerization;
   after approximately 20 to 60 wt % of the styrene monomer has been converted to polystyrene, introducing to the suspension polymerization an additive selected from the group consisting of carbon black, graphite, and combinations thereof; and after a period of polymerizing to allow droplet size to equilibrate to within a desired size range between about 0.1 mm and about 1.0 mm, then
   continuing to polymerize the styrene monomer to polystyrene by suspension polymerization to produce gray EPS having:
      a weight average molecular weight between about 50,000 and about 1,000,000 amu;
      a bead size between about 50 and about 1500 microns;
      a bead distribution where from about 10 to about 90 weight % of the beads are in the range of about 850 to about 1170 microns; and
      a cell size between about 4 and about 20 cells per millimeter.

2. The method of claim 1 where the gray EPS has a density from about 5 to about 35 g/l.

3. The method of claim 1 where the additive is introduced by a method selected from the group consisting of:
   introducing the additive predispersed as a masterbatch;
   introducing the additive as fluff or powder grade; and combinations thereof.

4. The method of claim 3, where
   when the additive is introduced predispersed as a masterbatch:
      a primary free radical initiator is introduced which is activated at about 90° C. in an amount from about 0.3 wt % to about 0.5 wt % based on the styrene monomer, and
      a secondary free radical initiator is introduced which is activated at about 130° C. in an amount from about 0.1 wt % to about 0.3 wt % based on the styrene monomer;
   when the additive is introduced as fluff or powder grade:
      a free radical initiator is introduced which is in an initial dose in an amount from about 0.3 wt % to about 0.5 wt % based on the styrene monomer, and
      a free radical initiator is introduced which is in an additional dose in an amount from about 0.4 wt % to about 0.6 wt % based on the styrene monomer; and
   when the additive is introduced as a combination of predispersed as a masterbatch and as fluff or powder grade:

a free radical initiator is introduced which is in an initial dose in an amount from about 0.3 wt % to about 0.5 wt % based on the styrene monomer, and a free radical initiator is introduced which is in an additional dose in an amount from about 0.3 wt % to about 0.5 wt % based on the styrene monomer.

5. The method of claim 1 where the amount of additive introduced ranges from about 0.1 to about 10 wt %, based on the produced gray EPS.

6. A method for preparing gray expanded polystyrene (EPS), the method comprising:

polymerizing styrene monomer to polystyrene by suspension polymerization;

after approximately 20 to 60 wt % of the styrene monomer has been converted to polystyrene, introducing to the suspension polymerization an additive selected from the group consisting of carbon black, graphite, and combinations thereof; and after a period polymerizing to allow droplet size to equilibrate to within a desired size range between about 0.1 mm and about 1.0 mm; and continuing to polymerize the styrene monomer to polystyrene by suspension polymerization to produce gray EPS having:

a density from about 5 to about 35 g/l;

a cell size between about 4 and about 20 cells per millimeter;

a weight average molecular weight between about 50,000 and about 1,000,000 amu;

a bead size between about 50 and about 1500 microns; and a bead distribution where from about 10 to about 90 weight % of the beads are in the range of about 850 to about 1170 microns;

where the polymerizing has a polymerization rate, and where the polymerization rate has about 35 wt % to about 60 wt % styrene monomer remaining after about 3 hours from the beginning of polymerizing.

7. The method of claim 6 where the additive is introduced by a method selected from the group consisting of:

introducing the additive predispersed as a masterbatch;

introducing the additive as fluff or powder grade; and combinations thereof.

8. The method of claim 7 introduced predispersed as a masterbatch:

a primary free radical initiator is introduced which is activated at about 90° C. in an amount from about 0.3wt % to about 0.5 wt % based on the styrene monomer, and a secondary free radical initiator is introduced which is activated at about 130° C. in an amount from about 0.1 wt % to about 0.3 wt % based on the styrene monomer;

when the additive is introduced as fluff or powder grade:

a free radical initiator is introduced which is in an initial dose in an amount from about 0.3 wt % to about 0.5 wt % based on the styrene monomer, and a free radical initiator is introduced which is in an additional dose in an amount from about 0.4 wt % to about 0.6 wt % based on the styrene monomer; and when the additive is introduced as a combination of predispersed as a masterbatch and as fluff or powder grade:

a free radical initiator is introduced which is in an initial dose in an amount from about 0.3 wt % to about 0.5 wt % based on the styrene monomer, and a free radical initiator is introduced which is in an additional dose in an amount from about 0.3 wt % to about 0.5 wt % based on the styrene monomer.

9. The method of claim 6 where the amount of additive introduced ranges from about 0.1 to about 10 wt %, based on the produced gray EPS.

10. A method for preparing gray expanded polystyrene (EPS), the method comprising:

polymerizing styrene monomer to polystyrene by suspension polymerization;

after approximately 20 to 60 wt % of the styrene monomer has been converted to polystyrene, introducing to the suspension polymerization an additive selected from the group consisting of carbon black, graphite, and combinations thereof, and after a period polymerizing to allow droplet size to equilibrate to within a desired size range, where the additive is introduced by a method selected from the group consisting of:

introducing the additive predispersed as a masterbatch;

introducing the additive as fluff or powder grade; and combinations thereof;

when the additive is introduced predispersed as a masterbatch:

a primary free radical initiator is introduced which is activated at about 90° C. in an amount from about 0.3 wt % to about 0.5 wt % based on the styrene monomer, and a secondary free radical initiator is introduced which is activated at about 130° C. in an amount from about 0.1 wt % to about 0.3 wt % based on the styrene monomer;

when the additive is introduced as fluff or powder grade:

a free radical initiator is introduced which is activated at about 90° C. in an initial dose in an amount from about 0.3 wt % to about 0.5 wt % based on the styrene monomer, and a free radical initiator is introduced which is activated at about 130° C. in an additional dose in an amount from about 0.4 wt % to about 0.6wt % based on the styrene monomer; and when the additive is introduced as a combination of predispersed as a masterbatch and as fluff or powder grade:

a free radical initiator is introduced which is activated at about 90° C. in an initial dose in an amount from about 0.3 wt % to about 0.5% wt % based on the styrene monomer, and a free radical initiator is introduced which is activated at about 130° C. in an additional dose in an amount from about 0.3 wt % to about 0.5 wt % based on the styrene monomer; and continuing to polymerize the styrene monomer to polystyrene by suspension polymerization to produce gray EPS.

11. The method of claim 10 where the desired droplet size ranges between about 0.1 mm and about 1.0 mm.

12. The method of claim 10 where the gray EPS:

has a weight average molecular weight between about 50,000 and about 1,000,000 amu;

has a bead size between about 50 and about 1500 microns;

has a bead distribution where from about 10 to about 90 weight % of the beads are in the range of about 850 to about 1170 microns; and has a cell size between about 4 and about 20 cells per millimeter.

13. The method of claim 10 where the gray EPS has a density from about 5 to about 35 g/l.

14. The method of claim 10 where the amount of additive introduced ranges from about 0.1 to about 10 wt %, based on the produced gray EPS.

15. The method of claim 10 where the polymerizing has a polymerization rate, and where the polymerization rate has about 35 wt % to about 60 wt % styrene monomer remaining after about 3 hours from the beginning of polymerizing.

\* \* \* \* \*